UNITED STATES PATENT OFFICE 2,656,391

PROCESSES FOR THE PREPARATION OF α-β UNSATURATED CYCLOPOLYMETHYLENIC KETONES

Max Stoll, Geneva, Switzerland, assignor to Firmenich & Co., successeurs de la Societe Anonyme M. Naef & Cie., Geneva, Switzerland, a corporation of Switzerland No Drawing. Application September 27, 1948, Serial No. 51,482. In Switzerland October 7, 1947

3 Claims. (Cl. 260—586)

The present invention has for subject matter a process for the preparation of α-β unsaturated cyclopolymethylenic ketones, alkylated or not, having from 10 to 18 carbon atoms in the ring, the formula of which is

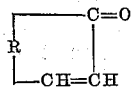

wherein R represents a chain of from 7 to 15 groups —$CH_2$—, one or more of which may be alkylated, for instance methylated.

That process consists in subjecting to a dehydration a 1,2-cyclopolymethylenic ketol, alkylated or not, having in its ring a number of members identical to that of the desired ketone.

The invention is based on the unexpected fact that in the 1,2-cyclopolymethylene-ketols, the hydroxyl group is so slightly fixed to the molecule that it can easily be eliminated by dehydration according to known methods notwithstanding the instability which characterizes those substances (self-oxidation, tautomerism).

Up to this date, the α-β unsaturated polymethylenic ketones were prepared by bromizing of the cyclopolymethylenic ketones, followed by an elimination of the hydrobromic acid. The cyclanones being, as it is expensive substances, the cyclenones so prepared could not in practice be utilized by reason of their excessive cost.

Today, the 1,2-cyclopolymethylenic ketols are readily accessible, owing to the process described in the U. S. A. patent application No. 714,650, filed December 6, 1946. Thus the dehydration of those substances constitutes a process for the preparation of α-β unsaturated cyclopolymethylenic ketones which is very economical and represents a real industrial progress.

The dehydration may be carried out according to known methods with all the cyclic compounds having from 10 to 18 members in the ring, the alkylated cyclanones included, or containing additional functional groups.

Instead of utilizing the 1,2-cyclanolones once purified, crude cyclanolones, such as those obtained by the process described in the U. S. A. patent application No. 714,650, may also be used as starting material.

The yields exceed 80% of the theoretical yield, as soon as the best working conditions are realized. The latter essentially consist in operating in the absence of oxygen, under good vacuo, in dilution, etc.

The dehydration may also be carried out by converting the cyclanolones into esters of formula

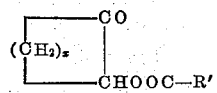

wherein R' is an organic radical and x a number running from 8 to 16, then by subjecting said esters to a thermal decomposition.

The α-β unsaturated cyclopolymethylenic ketones, alkylated or not, which have from 15 to 17 members in the ring have strong musk smells. They constitute important raw material for the perfume industry, either as such or after catalytical reduction into saturated ketones. They may also be used for new chemical syntheses, such as for instance that of the racemic muscon, which is another important raw material for perfumery.

Below are given a few examples of practical realization of the process according to the invention.

Example 1

50 gr. of raw thapsoin of M. P. 40–43°, prepared according to U. S. A. patent application No. 714,650 with a 98.3% yield of the theoretical yield, are introduced in a distilling flask which is directly connected with an upright tube 30 cm. long and 25 cm. wide, filled with catalyst. The flask is provided with three small side tubes to take in the thermometer, the capillary tube and a piping connected to a manometer. Each one of those tubulures is surrounded by a tube with an in and out flow of gas and filled with purified nitrogen, so as to exclude any trace of air let in through leaks in the corks. The flask and the catalyst tube may be electrically heated, and the temperature adjustable to $\mp 1°$ C. In the centre of the catalyst is the quicksilver bulb of a long-stemmed thermometer. The outlet of the catalyst tube is connected to a receiving flask, the latter connected to two Dewar tubes cooled at −80° and serving as a pit to withhold water. Between these tubes and the receiving flask is a manometer to measure the vacuo at the outlet of the catalyst tube. The entire equipment is evacuated with a Cenco pump at 0.08 mm. of Hg pressure. The catalyst consists of a Schering-Kahlbaum aluminium oxide powder carried by purified asbestos; it is heated to 350–352° C. The temperature of the distilling flask is first carried to 173° C., then gradually, within the space of 3 hours to 211° and finally within 1½ hours to 262°. It is to be noted that, simultaneously, the vacuo in the flask lowers from 0.08 mm. to 2 and even 3 mm., while on the side of the pump it remains at 0.08 mm. At the end of the operation, it is set again to 0.1 mm.

In the receiving flask condense 37.4 g. of product which crystallizes for the most part. In the Dewar tubes condense 3.45 g. of water and 1.8 g. of xylene (resulting from the preparation of the thapsoin).

On fractional distillation, 32 gr. of cyclohexadecenone are separated off which distil under 0.1 mm. between 128–130°, and 3.5 g. are also separated off which distil between 130–138°. The physical constants of the first fraction are: $d_4^{25}=0.930$, $n_D^{18}=1.489$.

A catalytical reduction in the presence of Pd on $BaSO_4$ converts the cyclohexadecenone into cyclohexadecanone, the semicarbazone of which melts at 180–182° C.

The yield in pure product, determined by the catalytical reduction, is 72% of the theoretical yield. If it is estimated that the crude thapsoin contained about 85% of pure thapsoin, the yield of the dehydration reaches 84.5%.

*Example 2*

6.6 g. of 15-methylcyclopentadecanol-2-one-1 are distilled slowly in a small column on aluminium oxide heated to 325–340°. 5.7 g. of distillate are collected, the latter being refractionated. 4.6 g. distil under 0.14 mm. between 120–131°. The physical constants of the 15-methyl-cyclopentadecene-2,3-one-1 are: $d_4^{18}=0.9326$, $n_D^{18}=1.4924$. Yield: 74% of the theoretical yield.

*Example 3*

30 gr. of cyclodecanolone-1,2 distilled once are distilled on aluminum oxide as shown in Example 1. 25 gr. of crude cyclodecenone are obtained. By a treatment with calcium chloride in benzene solution, 5.0 g. of non-dehydrated product are eliminated. 19 gr. of cyclodecenone are left. To characterize the latter, it is catalytically reduced and 19.0 g. of crude cyclodecanone are obtained which yield 19.5 g. of semicarbazone melting at 198–200°. Yield: roughly 65% of the theoretical yield.

*Example 4*

5 gr. of cyclopentadecanolone-1,2 distilled once are added to 20 gr. of lauric acid and the mixture is heated in vacuo with 6 gr. of lauryl-chloride. Both the lauric acid and the excess of chloride are thereafter distilled in a good vacuo. Then the ester obtained is decomposed by raising the temperature of the bath from 250 to 300°; meanwhile the vacuo lowers to 20–15 mm.

A product distils between 160–190–210°; it is refractionated. The fraction which distils between 105–125° under a pressure of 0.1 mm. is thereafter diluted with ether and washed with sodium bicarbonate. Thus, 2.5 g. of cyclopentadecenone are obtained. Through catalytical reduction this compound may be converted into cyclopentadecanone, the semi-carbazone of which melts at 183–184°. Yield: roughly 50% of the theoretical yield.

*Example 5*

5 gr. of cyclopentadecanolone-1,2 are heated in vacuo with 0.01 g. of naphthalene-β-sulfonic acid. Between 140–150° of the oil bath, the water resulting from the dehydration distils. After 1 hour, the dehydrated product is subjected to a washing with carbonate, and the cyclopentadecenone-1,2 is thereafter distilled in a good vacuo B. P. 0.1 mm. Hg=110–115°. Yield: roughly 50% of the theoretical yield.

What I claim is:

1. A process for the preparation of alpha-beta unsaturated cyclopolymethylenic ketones having 10 to 18 carbon atoms in the ring consisting in dehydrating a 10 to 18 ring carbon atom 1,2-cyclopolymethylenic ketol by passing vapors of said ketol under reduced pressure over a solid contact mass comprising aluminum oxide.

2. A process for the preparation of alpha-beta unsaturated cyclopolymethylenic ketones having 10 to 18 carbon atoms in the ring consisting in dehydrating a compound consisting of 10 to 18 ring carbon atom 1,2-cyclopolymethylenic ketols by passing vapors of said ketol under reduced pressure over a solid contact mass comprising aluminum oxide suspended on a carrier.

3. The method as defined in claim 1, wherein the ketol vapors are mixed with an inert gas.

MAX STOLL.

References Cited in the file of this patent

UNITED STATES PATENTS

| Number | Name | Date |
|---|---|---|
| 2,139,360 | Fairbairn et al. | Dec. 6, 1938 |
| 2,228,268 | Hansley | Jan. 14, 1941 |
| 2,357,260 | Joyce | Aug. 29, 1944 |

OTHER REFERENCES

Beilstein's "Handbuch der Organischen Chemie," vol. VIII, page 2 (1925); vol. VIII, First Supplement, pages 504, 505, 508 (1931); vol. VIII, Second Supplement, pages 5–6 and 10 (1948). Published in Berlin.

Locquin et al.: Bull. Soc. Chim., vol. 45, pages 1107–1112 (1929).

Colonge: Bull. Soc. Chim., Series 5, vol. 2, pages 57–63 (1935).

Taylor: "Richter's Organic Chemistry," vol. II, pages 77–80 and 107–109, 3rd edition (1939). Nordeman Publishing Co., New York.